(12) United States Patent
Bedillion et al.

(10) Patent No.: US 7,626,894 B2
(45) Date of Patent: Dec. 1, 2009

(54) HEAT ASSISTED MAGNETIC RECORDING LIGHT DELIVERY WITH FIXED LASER AND ROTATING MIRROR

(75) Inventors: Mark David Bedillion, Allison Park, PA (US); Patrick Breckow Chu, Wexford, PA (US); Kevin Arthur Gomez, Wexford, PA (US); Tim Rausch, Gibsonia, PA (US); Edward Charles Gage, Mars, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 957 days.

(21) Appl. No.: 11/105,248

(22) Filed: Apr. 13, 2005

(65) Prior Publication Data

US 2006/0233062 A1    Oct. 19, 2006

(51) Int. Cl.
*G11B 11/00*    (2006.01)
(52) U.S. Cl. .................... 369/13.32; 369/13.24; 360/59
(58) Field of Classification Search ............... 74/471 R, 74/502.1; 248/487; 359/214, 216, 872, 874, 359/876, 881; 360/77.03; 369/13.13, 13.32, 369/112.09, 112.29; 372/15
See application file for complete search history.

(56) References Cited

U.S. PATENT DOCUMENTS

| | | | |
|---|---|---|---|
| 3,808,428 A * | 4/1974 | Barry et al. ................. | 398/125 |
| 5,850,375 A | 12/1998 | Wilde et al. | |
| 5,889,641 A | 3/1999 | Belser et al. | |
| 5,930,434 A | 7/1999 | Mowry et al. | |
| 6,034,938 A | 3/2000 | Heanue et al. | |
| 6,044,056 A | 3/2000 | Wilde et al. | |
| 6,058,094 A | 5/2000 | Davis et al. | |
| 6,061,323 A | 5/2000 | Jerman et al. | |
| 6,081,499 A | 6/2000 | Berger et al. | |
| 6,091,673 A * | 7/2000 | Murakami et al. ....... | 369/13.12 |
| 6,324,129 B1 | 11/2001 | Durnin et al. | |
| 6,414,911 B1 | 7/2002 | Wilde et al. | |
| 6,535,473 B1 | 3/2003 | Swanson et al. | |
| 6,545,970 B2 | 4/2003 | Durnin et al. | |
| 6,795,630 B2 | 9/2004 | Challener et al. | |
| 2002/0003752 A1 | 1/2002 | Fuji et al. | |
| 2003/0103440 A1 | 6/2003 | Kim | |
| 2004/0062503 A1 | 4/2004 | Challener | |
| 2004/0120064 A1 | 6/2004 | Dugas et al. | |

OTHER PUBLICATIONS

U.S. Appl. No. 10/718,162, filed Nov. 20, 2003, Peng.
U.S. Appl. No. 10/854,564, filed May 26, 2004, Gomez et al.
U.S. Appl. No. 10/881,609, filed Jun. 30, 2004, Rausch.

* cited by examiner

*Primary Examiner*—Hoa T Nguyen
*Assistant Examiner*—Jesse Hauck
(74) *Attorney, Agent, or Firm*—Robert P. Lenart, Esq.; Pietragallo Gordon Alfano Bosick & Raspanti, LLP (57) ABSTRACT

An apparatus comprises a moveable arm for positioning an optical transducer adjacent to a storage medium, a stationary light source, and a moveable mirror mounted at a pivot axis of the arm for reflecting light from the light source to the optical transducer. An actuator can be provided for rotating the moveable mirror through an angle of about one half of an angle of rotation of the moveable arm.

16 Claims, 9 Drawing Sheets

HEAT ASSISTED MAGNETIC RECORDING LIGHT DELIVERY WITH FIXED LASER AND ROTATING MIRROR

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

FIELD OF THE INVENTION

This invention relates to data storage devices, and more particularly to such devices that can be used in optical recording and thermally assisted magnetic recording.

BACKGROUND OF THE INVENTION

In thermally assisted optical/magnetic data storage, information bits are recorded on a layer of a storage medium at elevated temperatures, and the heated area in the storage medium determines the data bit dimension. Heat assisted magnetic recording (HAMR) generally refers to the concept of locally heating a recording medium to reduce the coercivity of the recording medium so that the applied magnetic writing field can more easily direct the magnetization of the recording medium during the temporary magnetic softening of the recording medium caused by the heat source. For HAMR, a tightly confined, high power laser light spot is used to preheat a portion of the recording medium to substantially reduce the coercivity of the heated portion. Then the heated portion is subjected to a magnetic field that sets the direction of magnetization of the heated portion. In this manner the coercivity of the medium at ambient temperature can be much higher than the coercivity during recording, thereby enabling stability of the recorded bits at much higher storage densities and with much smaller bit cells. Heat assisted magnetic recording can be applied to any type of magnetic storage media, including tilted media, longitudinal media, perpendicular media and patterned media.

In HAMR disc drives, it is desirable to efficiently deliver the laser light to the recording head. Various light delivery schemes have been proposed which include a laser or optical fiber that moves with the slider, suspension, or actuator arm. However, mounting a laser on the slider, suspension, or the actuator arm requires additional electrical connections for the laser. Also, the electrical power dissipated by the laser will substantially heat the slider, which is undesirable for obtaining the best performance from the reader. The added mass of the laser on the slider (or suspension assembly) may also degrade the dynamic and shock performance of the suspension. Optical fiber adds cost and is typically stiff. Attaching a stiff fiber to the suspension or actuator arm complicates the design.

There is a need for a recording device that can provide localized heating of a recording medium without the need for optical fiber or additional connections on the slider, suspension, or actuator arm.

SUMMARY OF THE INVENTION

This invention provides an apparatus comprising a moveable arm for positioning an optical transducer adjacent to a storage medium, a stationary light source, and a moveable mirror mounted at a pivot axis of the arm for reflecting light from the light source to the optical transducer. An actuator can be provided for rotating the moveable mirror through an angle of one half of an angle of rotation of the moveable arm.

In another aspect, the invention provides an apparatus comprising a first moveable arm for positioning a first optical transducer adjacent to a storage medium, a second moveable arm for positioning a second optical transducer adjacent to the storage medium, a stationary light source for producing a beam in a direction along a pivot axis of the first and second moveable arm, a first mirror mounted at the pivot axis for reflecting light from the light source to the first optical transducer, a second mirror mounted at the pivot axis for reflecting light from the light source to the second optical transducer, and means for moving the first mirror away from the beam.

The invention further encompasses an apparatus comprising a first moveable arm for positioning a first optical transducer adjacent to a storage medium, a second moveable arm for positioning a second optical transducer adjacent to the storage medium, a stationary light source for producing a beam in a direction along a pivot axis of the first and second moveable arm, a beam splitter mounted at the pivot axis for directing a portion of the beam from the light source to the first optical transducer, and a mirror mounted at the pivot axis for reflecting light from the light source to the second optical transducer.

DETAILED DESCRIPTION OF THE INVENTION

Figure 1:
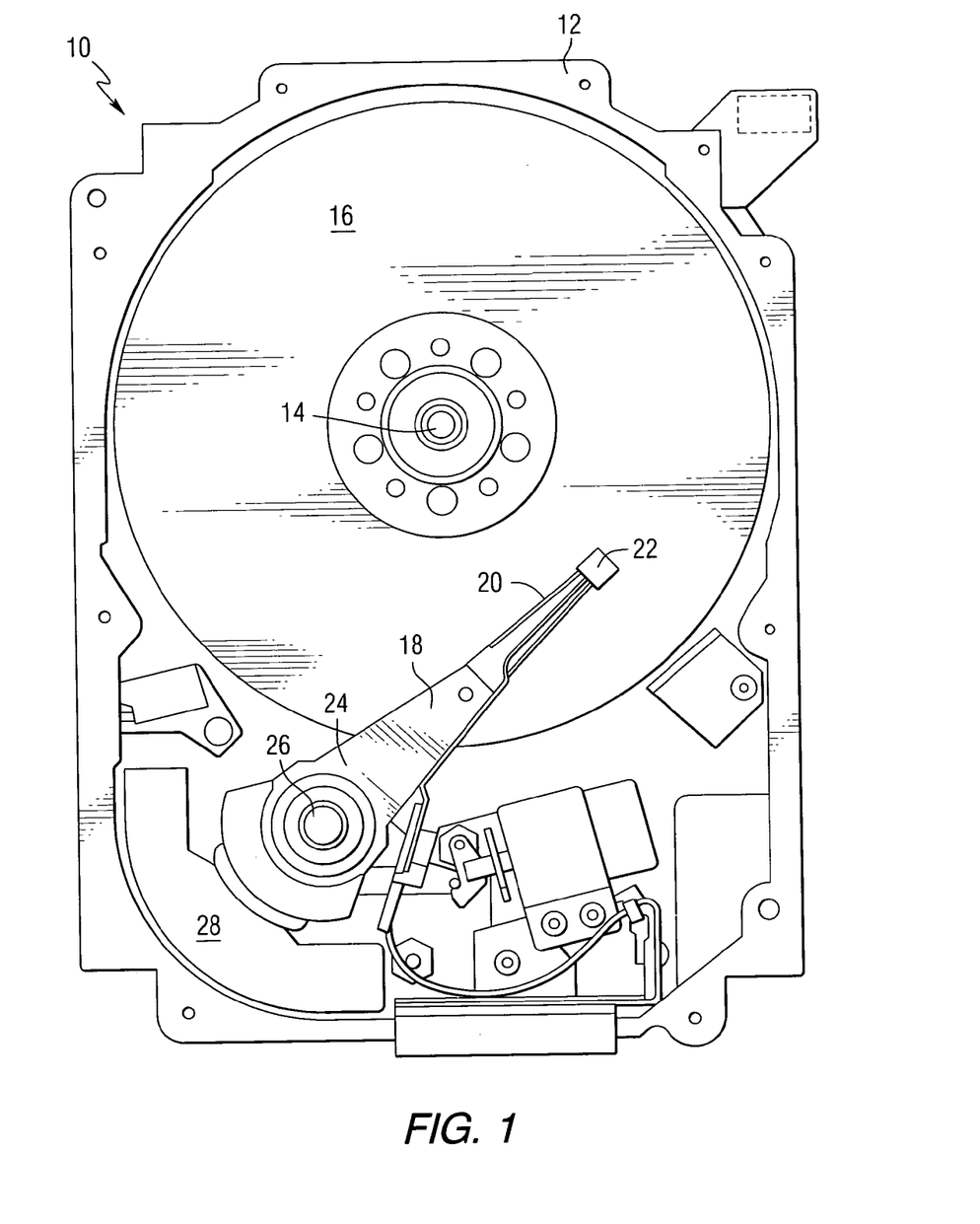
FIG. 1 is a pictorial representation of the mechanical portion of a disc drive that can be constructed in accordance with the invention.

FIG. 1 is a pictorial representation of the mechanical portion of a disc drive 10 that can be constructed in accordance with the invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view.

For heat assisted magnetic recording (HAMR), an electromagnetic wave of, for example, visible, infrared or ultraviolet light is directed onto a surface of the data storage medium to raise the temperature of a localized area of the medium to facilitate switching of the magnetization of the area. Recent designs of HAMR recording heads include a thin film waveguide on a slider to guide light to the storage medium for localized heating of the storage medium. To launch light into the waveguide, a grating coupler can be used.

Figure 2:
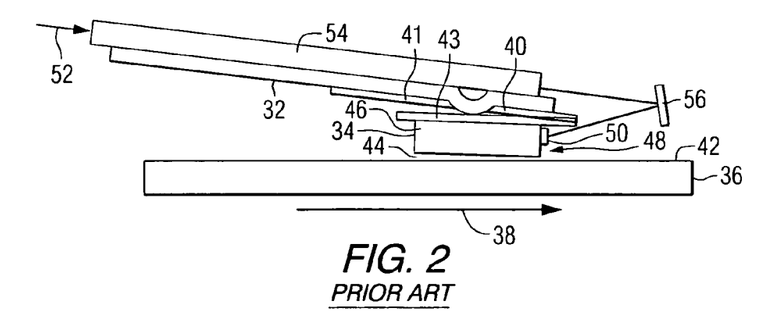
FIG. 2 is a side view of a portion of an actuator arm and an associated slider.

FIG. 2 is a schematic representation of a portion of a suspension arm 32 and slider 34, in combination with a magnetic recording disc 36. During writing and/or reading of data, the disc moves relative to the slider in a direction indicated by arrow 38. The slider is coupled to the suspension arm by a gimbal assembly 40 positioned adjacent to a surface 42 of the disc and separated from the surface of the disc by an air bearing 44. The gimbal assembly includes a first portion 41 connected to the suspension arm 32 and a second portion 43 connected to the slider 34. The second portion is cantilevered to the first portion. The slider has a leading, or front, end 46 and a trailing, or back, end 48. The leading end faces toward the pivot point of the suspension arm and the trailing end faces away from the pivot point of the suspension arm. The slider includes an optical transducer 50 mounted adjacent to the trailing end. A laser produces a beam of light illustrated by arrow 52 that is transmitted toward the slider by an optical fiber 54. A mirror 56 is mounted at the end of the suspension arm to reflect the light toward the optical transducer. The prism or mirror directs the light from the fiber onto the transducer on the slider.

Figure 3:
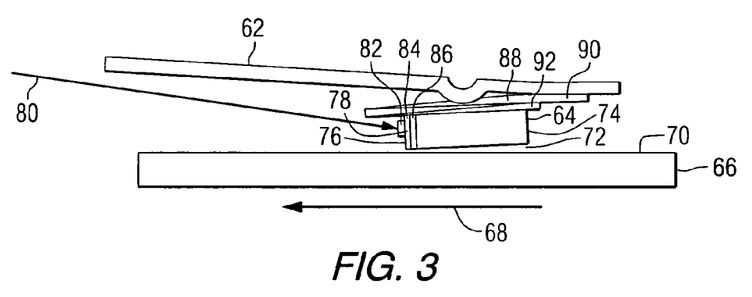
FIG. 3 is a side view of a portion of an actuator arm and a reversed slider.

FIG. 3 is a schematic representation of a portion of an actuator arm 62 and slider 64, in combination with a storage medium in the form of a magnetic recording disc 66. This configuration illustrates a reversed slider. During writing and/or reading of data, the disc moves relative to the slider in a direction indicated by arrow 68. The slider is positioned adjacent to a surface 70 of the disc and separated from the surface of the disc by an air bearing 72. The slider has a leading end 74, also called a front or distal end, and a trailing end 76, also called a back or proximal end. The leading end faces away from, and is therefore distal to, the pivot point of the suspension arm and the trailing end faces toward, and is therefore proximal to, the pivot point of the suspension arm. The slider includes an optical transducer 78 mounted adjacent to the trailing end. A source of the electromagnetic radiation such as a laser, that can emit for example infrared, visible or ultraviolet light, produces a beam of light 80 that is delivered to the optical transducer 78 through free space. The optical transducer can include a grating coupler 82 for coupling the light into the transducer. The optical transducer can further include a planar waveguide 84 for transmitting light to the air bearing surface of the slider. The light is then coupled to the surface of the storage medium to raise the temperature of a portion of the surface of the storage medium. The slider can further include a magnetic recording head 86 for producing a magnetic field that is used to affect the magnetization of the storage medium. A read head can also be included on the slider.

The slider is connected to the suspension arm 62 by a gimbal assembly 88. The gimbal assembly includes a first portion 90 connected to the suspension arm 62 and a second portion 92 connected to the slider. The second portion is cantilevered to the first portion. The gimbal assembly of FIG. 3 is oriented such that the optical transducer is near the end of the slider that faces the arm pivot point. The planar waveguide of the transducer can include a core layer for transmitting electromagnetic radiation and a cladding layer positioned adjacent to the core layer.

This invention eliminates the need for an optical fiber and provides for free space coupling of the light beam to the slider. A fixed laser source is mounted in the drive away from the actuator arm and directs a laser beam at a mirror that moves with the actuator arm. The reflected laser beam from the mirror is then directed to the slider and eventually to a location on the recording disc near the transducer through a number of different possible means, such as using a suspension with a slider oriented as shown in FIGS. 2 or 3.

In one embodiment of the invention, a moving mirror is mounted to rotate about a pivot axis of the actuator arm. The surface of the mirror is approximately normal to the surface of the recording disc. The mirror rotates about the same axis as the actuator arm, but with a mechanical angular reduction that results in the angular rotation of the mirror being one half of the angular rotation of the arm.

Figure 4A:
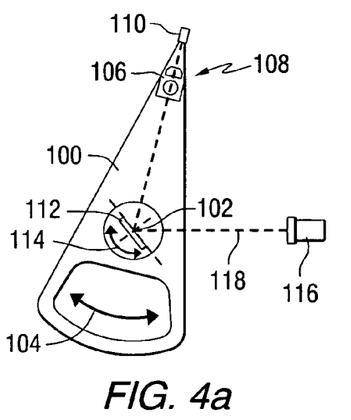
FIGS. 4a and 4b are schematic illustrations of a head-gimbal-assembly with a reversed slider suspension and a rotating mirror at the center of rotation of the actuator arm.
Figure 4B:
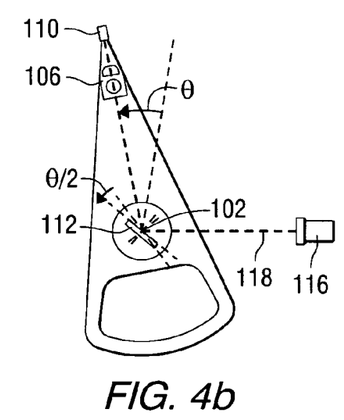

FIG. 4a shows an arm 100 mounted to pivot about a pivot axis 102 to allow movement of the arm as indicated by arrow 104. A suspension 106 is mounted near an end 108 of the arm and supports a slider 110. The slider includes a transducer for directing light onto an adjacent recording medium (not shown). A moveable mirror 112 is mounted to rotate about the pivot axis of the arm as indicated by arrow 114. A laser module 116 is mounted at a fixed location in the drive and is used to direct a laser beam onto the mirror. The mirror reflects the beam to the transducer on the slider. The laser module can include a heat sink, as well as focusing and collimating optics. As shown in FIG. 4b, when the arm rotates through an angle $\theta$, the mirror rotates through an angle $\theta/2$.

The laser is positioned to the side of the actuator arm. If the beam were to strike the mirror at a point that is not on the rotational axis of the mirror, rotation of the mirror would lead to a translation of the effective beam source. Therefore, the laser produces a light beam 118 that is directed to the mirror at the pivot axis to eliminate translation of the beam.

Additional mirrors may be used in the optical path from the laser to the primary rotating mirror to aid in the assembly process. For example, additional mirrors may be used to direct the light from the fixed laser to the rotating mirror. The use of such additional mirrors removes a line-of-sight restriction on the placement of the laser in the drive. In this configuration, the incident light beam at the moving mirror will be reflected along the length of the actuator arm and then along the suspension, traveling between the surface of the media and the suspension.

The reflected laser beam ultimately hits an optical coupler, such as a grating that couples light into the transducer on the slider. In this example, the slider is mounted in the reversed direction from a traditional slider such that the trailing edge of the slider has a direct path to the moving mirror. The transducer on the slider focuses the light to a small spot on the media.

In the embodiment of FIGS. 4a and 4b, a relatively large, inexpensive laser (array of lasers for multi-head drives) is mounted near the actuator arm. The laser can be combined with collimating and focusing optics to shine a light beam onto a mirror mounted within the actuator assembly and positioned at an angle to cause the beam to be directed towards the slider. At the slider, additional optics or a reversed slider can be used to apply the beam for HAMR. The mirror is mounted such that it rotates about the same axis as the actuator arm, but rotates only ½ the amount that the actuator arm rotates. The ½ rotation relationship is used to align the laser with the slider (or other optics).

Figure 5:
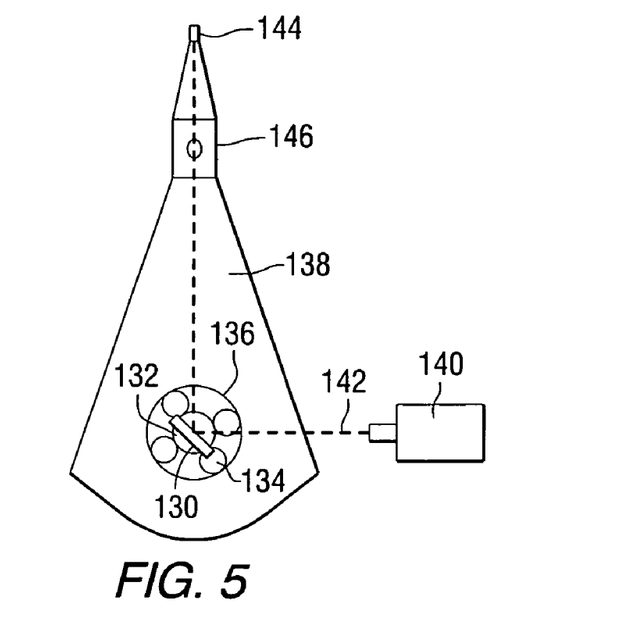
FIG. 5 is a schematic illustration of a rotating mirror with a gear rotation assembly.

The angular reduction can conceptually be accomplished using planetary gearing as shown in FIG. 5, wherein a mirror 130 is mounted on a central, or sun, gear 132, that is coupled to a plurality of planet gears 134 that are coupled to an inner race 136 formed by an opening in an actuator arm 138. A laser 140 mounted at a fixed location in the drive produces a light beam 142 that reflects off of the mirror toward a slider 144 supported by a suspension 146.

Figure 6A:
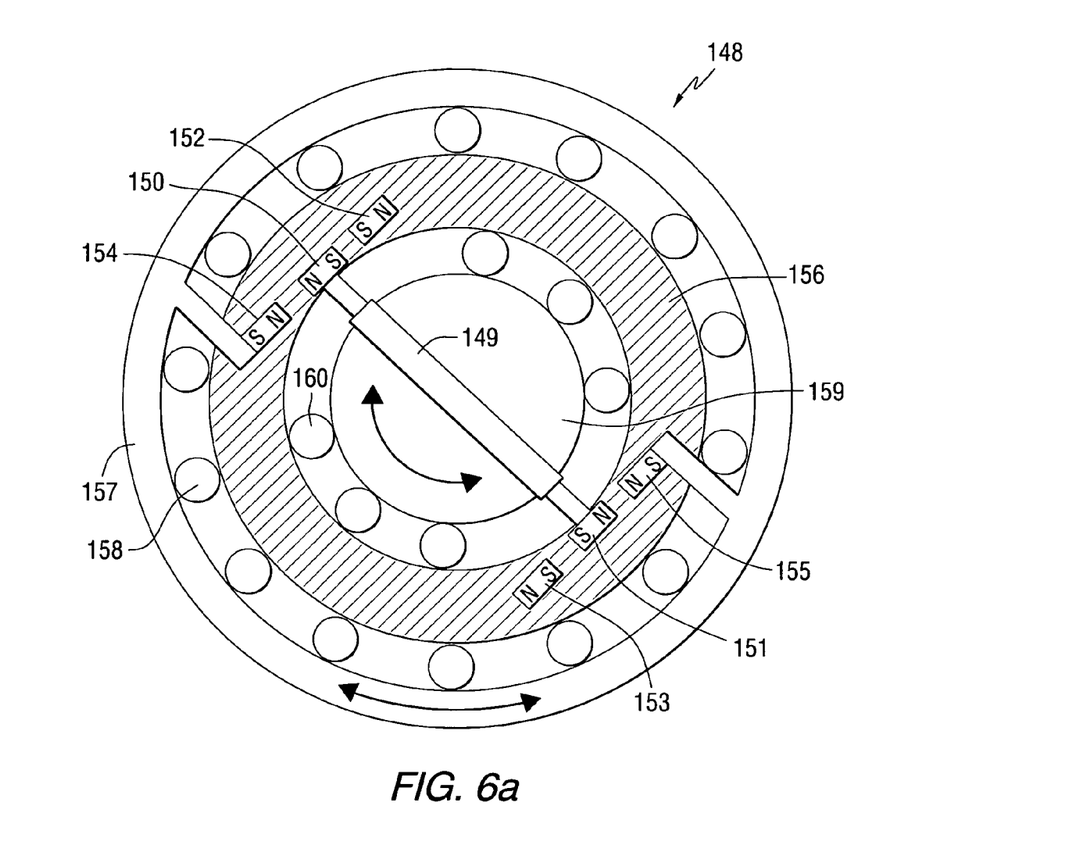
FIG. 6a is a schematic illustration of a magnetic mirror positioning device.

FIG. 6a shows an alternative mounting assembly 148 for the moveable mirror 149 using permanent magnets 150, 151, 152, 153, 154 and 155. Magnets 150 and 151 are attached to opposite ends of the mirror. Magnets 152 and 153 are attached to the inner race 156 and magnets 154 and 155 are attached to the outer race 157 of the actuator arm ball bearing 158. The magnets are oriented in a way such that the magnets attached to the bearing repel the magnets attached to the mirror. The magnets attached to the outer bearing race rotate with the actuator arm, while those attached to the inner race remain stationary. The repelling magnetic forces between the magnets attached to the mirror and the magnets attached to the races maintain the centers of the mirror magnets at ½ the distance between the inner and outer race magnets, effectively producing a ½ angular relationship between the mirror rotation and the rotation of the outer race of the bearing.

The outer race is fixed to the arm and the inner race is formed by the bearing shaft, which is fixed relative to the drive. The mirror is mounted to a separate shaft 159 with bearings 160, so that it is supported rigidly in the axial direction, but allowed to rotate. As the arm rotates, the magnets attached to the outer race will move. Since the magnetic forces cause the mirror magnets to stay at the midpoint between the bearing magnets, the mirror magnet will move ½ as much as the outer race magnets, which results in a ½ angular relationship.

Figure 6B:
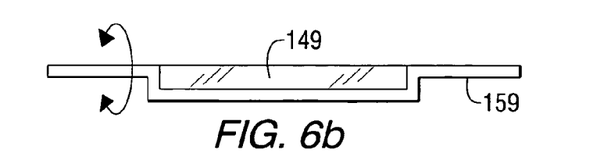
FIGS. 6b and 6c are side views of mirror mounting assemblies.
Figure 6C:
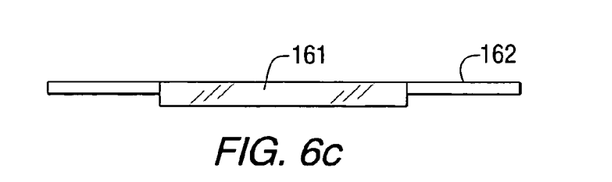

FIG. 6b is a side view of a mirror assembly wherein the mirror 149 is mounted on the shaft 159 that wraps around the rear side of the mirror. FIG. 6c is a side view of an alternative mirror assembly wherein the mirror 161 is mounted on the shaft 162 that is connected to opposite ends of the mirror.

Figure 7A:
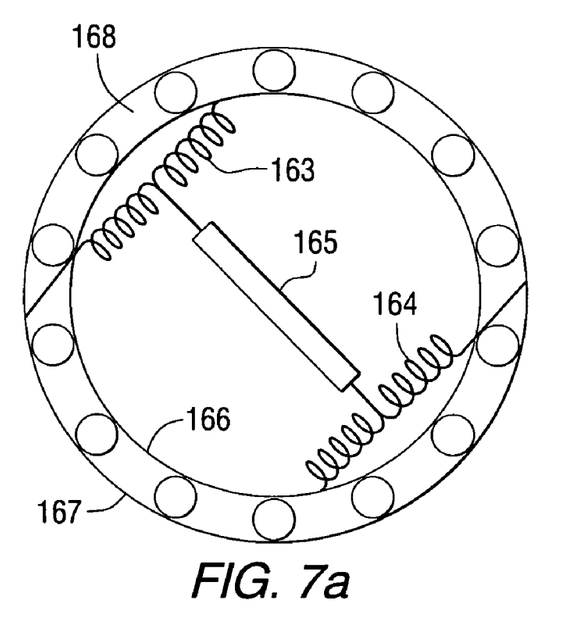
FIGS. 7a, 7b and 7c are schematic illustrations of spring mirror positioning devices.

In another embodiment illustrated in FIG. 7a, springs 163 and 164 are used to maintain a ½ gear reduction. Intermediate points on the springs 163 and 164 are connected to opposite ends of the moveable mirror 165. The springs are stretched between the inner race 166 and outer race 167 of the bearing 168. In one example, the mirror is attached to the springs at their centers.

The outer race is fixed to the arm and the inner race is the bearing shaft, which is fixed relative to the drive. As in the example of FIG. 6a, the mirror can be mounted to a separate shaft and bearings, so that it is supported rigidly in the axial direction, but allowed to rotate. As the arm rotates, the springs ensure that the attachment point on the mirror moves ½ as much as the attachment point on the outer race. Thus the mirror will move ½ as much as the outer race, which results in a ½ angular relationship.

Figure 7B:
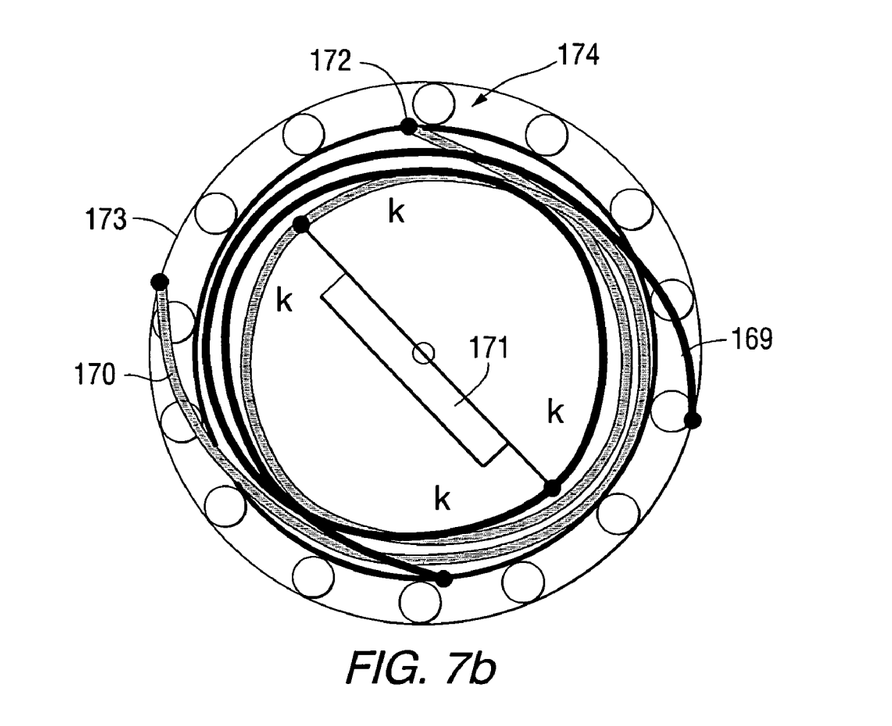

While FIG. 7a shows linear springs for clarity, rotational springs can be used to maintain accurate spacing. FIG. 7b shows springs 169 and 170 are used to maintain a ½ reduction in angular movement of the mirror. The springs 169 and 170 are connected to opposite ends of the moveable mirror 171. The springs are stretched between the inner race 172 and outer race 173 of the bearing 174. As in the example of FIG. 6a, the mirror can be mounted to a separate shaft and bearing, so that it is supported rigidly in the axial direction, but allowed to rotate. However with the rotational springs of FIG. 7b, the separate mirror shaft is optional. Rotational springs are specifically designed to behave well in this geometry.

Figure 7C:
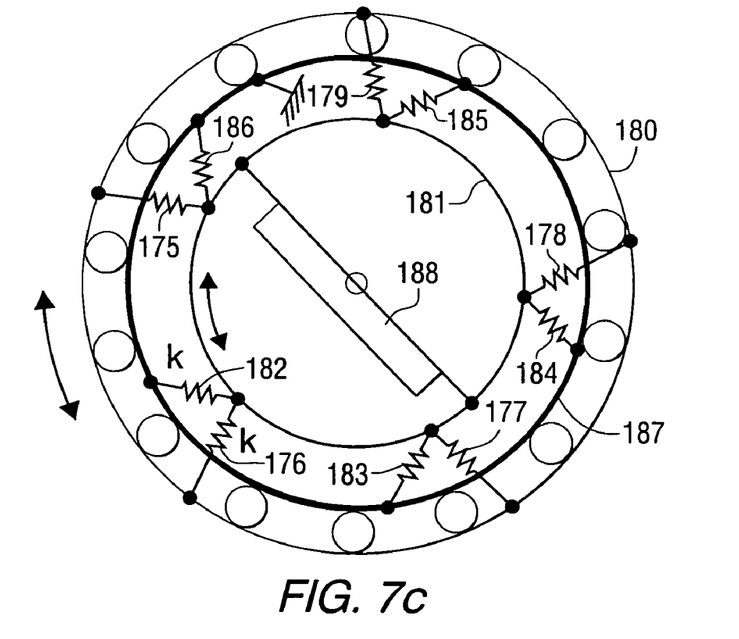

FIG. 7c shows an alternative mirror mounting assembly. In FIG. 7c, linear springs 175, 176, 177, 178 and 179 are each connected between an outer race 180 of a bearing 181, and a ring 181. Linear springs 182, 183, 184, 185 and 186 are each connected between an inner race 187 of the bearing 181, and the ring 181. The mirror 188 is connected to the ring. The mirror mounting assembly of the FIGS. 5, 6 (a-c), and 7 (a-c) are also referred to as an actuator assembly or an actuator.

Figure 8:
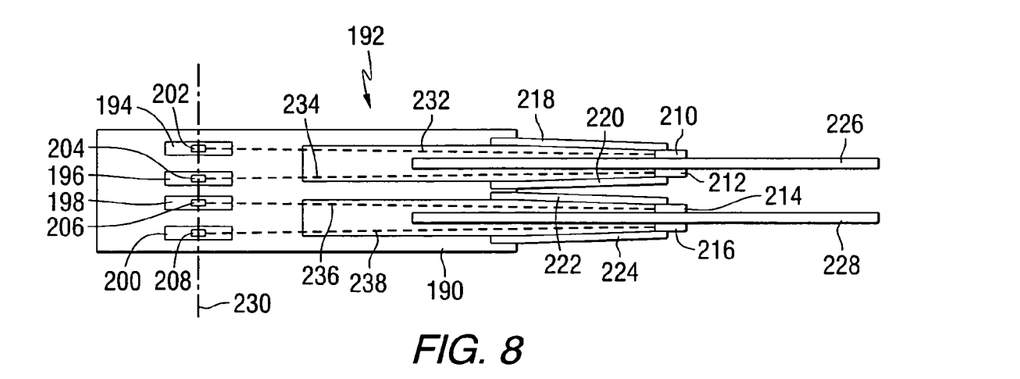
FIG. 8 is a schematic illustration of an E-Block with slots for light delivery for a head-gimbal-assembly (HGA) with a reversed slider.

In order to deliver the light to the mirror, the E-block 190 of actuator arm 192 may be modified as shown in FIG. 8. Slots 194, 196, 198 and 200 are cut (with an arc corresponding to the angular stroke of the actuator, of for example about 25 degrees) along the side of the E-block to allow light to pass from a plurality of laser sources (not shown) to mirrors 202, 204, 206 and 208 mounted along the pivot axis of the arm. An additional set of slots would be needed to allow light beams to go from the mirrors toward the sliders 210, 212, 214 and 216 that are coupled to the actuator arm by suspensions 218, 220, 222 and 224. The sliders are positioned adjacent to surfaces of discs 226 and 228. The mirrors are mounted to rotate about the pivot axis 230 of the arm. A plurality of lasers are used to shine light onto the mirrors. The light is reflected off of the mirrors and directed to the sliders as illustrated by lines 234, 236, 238 and 240. The laser heights and positions may be adjusted in the assembly process to ensure that the lasers hit their targets. In the embodiment of FIG. 8, the light beams are directed to the sliders which are mounted 180 degrees reversed on the suspensions compared to traditional suspensions. In this configuration, the laser beams reflected by the mirrors at the actuator pivot travels along direct optical paths to grating couplers on the trailing ends of the sliders. This approach minimizes the length of the optical path.

Figure 9:
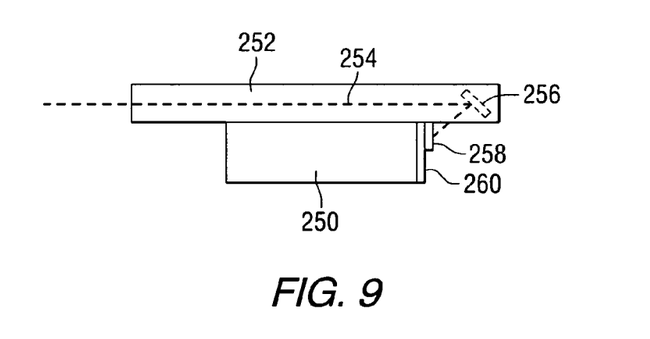
FIG. 9 is a side view of a slider with an associated optical bench.

In another embodiment, the laser can be mounted such that the light beam goes through a micromachined optical bench situated above the slider, which directs the beam to the optical grating on a slider with a traditional orientation at the tip of the suspension. FIG. 9 is a side view of a slider 250 with an associated micro-optical bench 252. The optical bench 252 is positioned above the slider 250, which is mounted in the traditional orientation. The optical bench includes an optical path 254 and a mirror 256 for reflecting light to a grating coupler 258 on an optical transducer 260 on the slider. This approach eliminates the constraints and requirements of a reversed slider. While the optical path is shown to be horizontal, it may be inclined so that the ray hits the mirror at an angle with respect to the horizontal plane.

Figure 10:
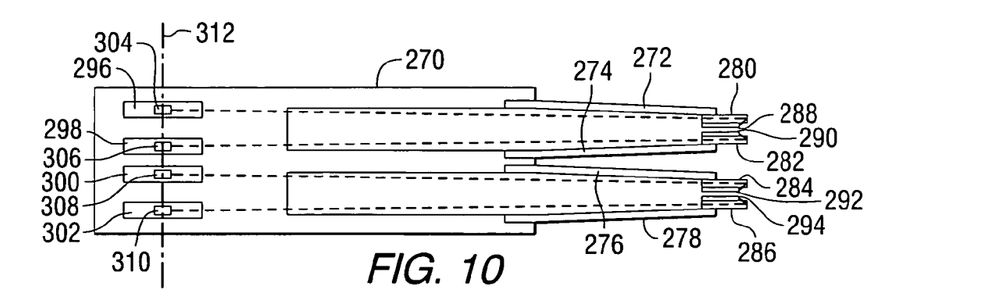
FIG. 10 is a schematic illustration of a light path for an HGA with an optical bench on the sliders.

FIG. 10 is a side view of an actuator arm 270 coupled to suspensions 272, 274, 276 and 278 that support optical benches 280, 282, 284 and 286, and sliders 288, 290, 292 and 294. Slots 296, 298, 300 and 302 are cut along the side of the E-block to allow light to pass from a plurality of laser sources to mirrors 304, 306, 308 and 310 mounted along the pivot axis 312 of the arm. An additional set of slots would be needed to allow light beams to go from the mirror toward the sliders.

Figure 11:
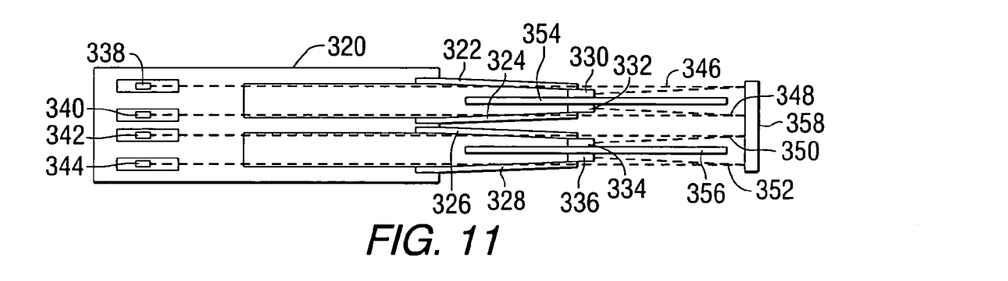
FIG. 11 is a schematic illustration of a light delivery assembly with a cylindrical mirror.

An alternative embodiment uses a passive cylindrical mirror to direct the laser beam from the moveable mirror to the grating at the trailing edge of the slider with a traditional orientation. This concept is illustrated in FIG. 11. The example of FIG. 11 uses an E-block 320 and a plurality of suspensions 322, 324, 326 and 328; sliders 330, 332, 334 and 336; and mirrors 338, 340, 342 and 344 in a manner similar to the example of FIG. 10. However, in FIG. 11, the light beams 346, 348, 350 and 352 from the mirrors at the actuator pivot travel between the suspension and the recording media 354 and 356 and then through openings in the suspensions. The beams are then reflected off a cylindrical mirror 358 (whose focus is at the actuator pivot), and are directed to the sliders. Alternatively, the light beams from the mirrors at the actuator pivot may travel above the media as well as the suspensions, then hit the cylindrical mirror, and finally the sliders. This approach allows the use of an HGA with a traditional slider orientation, and without additional components.

Figure 12:
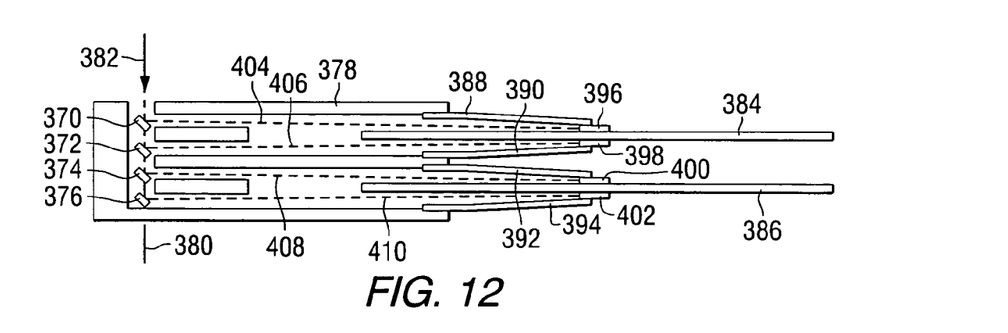
FIG. 12 is a schematic illustration of a light delivery assembly with an array of mirrors at the actuator pivot.

In another embodiment of the invention as shown in FIG. 12, the incident light beam is directed along the pivot axis of the actuator arm and the moving mirrors 370, 372, 374 and 376 rotate simultaneously with the actuator arm 378 about the same axis 380. The mirrors are not mounted with their surfaces perpendicular to the recording media. Instead, the planes of the mirrors intersect the plane of the recording media, where the reflective surfaces of the mirrors face the recording surface of the disc. The mirrors must be tilted with respect to the media in order to direct the vertical light beam (which is normal to the media) to the slider grating.

In the example of FIG. 12, a light beam 382 traveling normal to the recording discs 384 and 386 along the actuator pivoting axis hits the mirrors and is reflected to the direction of the suspensions 388, 390, 392 and 394, and sliders 396, 398, 400 and 402 as illustrated by lines 404, 406, 408 and 410. The light beam is eventually directed to the sliders through one of the methods described above. As illustrated, in FIG. 12, the sliders are in a reversed configuration and the gratings on the trailing edges will receive the reflected light from the moving mirrors. For a multi-head and multi-disc system, each recording head requires a dedicated mirror. The mirror may be hinged near one side or edge so that the mirror may swing out of the path of the vertical light beam.

Figure 13:
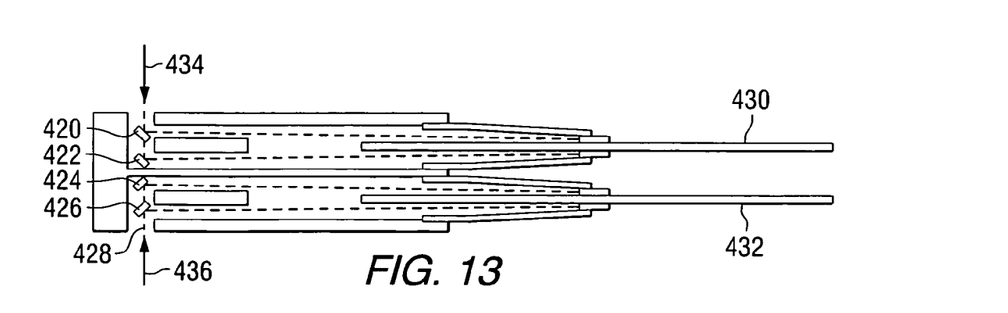
FIG. 13 is a schematic illustration of the use of two incident light beams for HAMR recording.

Another embodiment uses two incident light beams directed from the top and bottom sides of the actuator as shown in FIG. 13. The mirrors 420, 422, 424 and 426 would be aligned in a column along the actuator's axis of rotation 428. For two-sided discs 430 and 432, the two mirrors for each disc would be orientated at slightly different angles to achieve the desired angle of incidence of the gratings of the two sliders. As shown in FIG. 13, mirror 426 and mirror 422 would have the same angle, and mirror 420 and mirror 424 would have the same angle. Two incident light beams 434 and 436 are shown in FIG. 13. The two incident light beams may be generated with a single laser source with a beam splitter or with two separate laser sources. This configuration would allow simultaneous write capability for two different heads. Another advantage is that one fewer mirror requires actuation along the actuator pivot axis.

In the embodiments of FIGS. 12 and 13, selected mirrors would be actuated to avoid blocking the light path to other mirrors. As an example, since only a single light beam coming from the top of the actuator is used in FIG. 12, mirrors 370, 372, and 374 must move to the side in order for the incident light to hit mirror 376.

In the embodiments described above, all of the mirrors are centered along the axis of rotation of the actuator arm. In an alternative embodiment, only one of the mirrors is centered about the actuator pivot and an addition folding mirror is mounted on the actuator arm as shown in FIG. 14.

Figure 14:
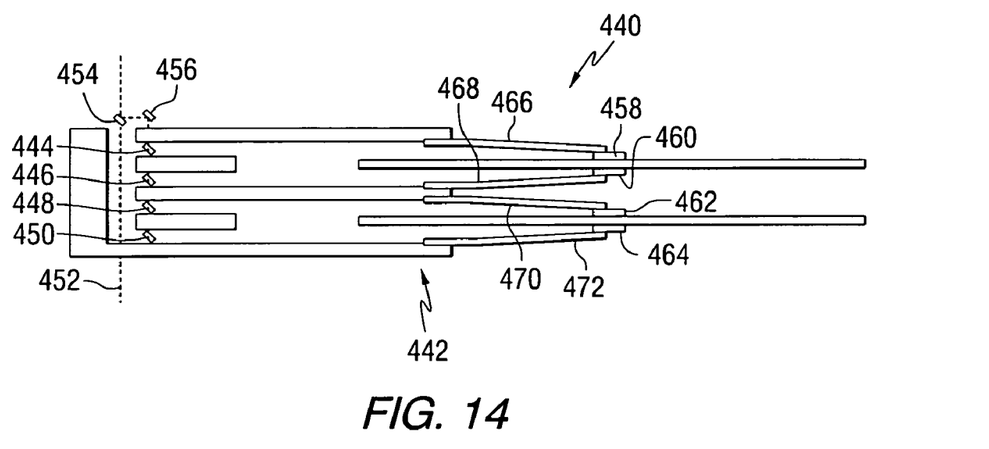
FIG. 14 is a schematic illustration of a light delivery assembly with an array of mirrors offset from the actuator pivot.

FIG. 14 is a schematic illustration of a light delivery assembly 440 including an actuator arm 442 with an array of mirrors 444, 446, 448 and 450 offset from the actuator arm pivot axis 452. An additional mirror 454 is mounted on the actuator arm pivot axis, and a folding mirror 456 is used to direct light onto the other mirrors. Mirrors 444, 446, 448 and 450 reflect the light and the reflected light passes through slots in the actuator arm to the reversed slider 458, 460, 462 and 464, that are supported by suspensions 466, 468, 470 and 472. The benefit of this approach is that the bearing design is no longer as severely affected by the use of the mirror array.

Figure 15:
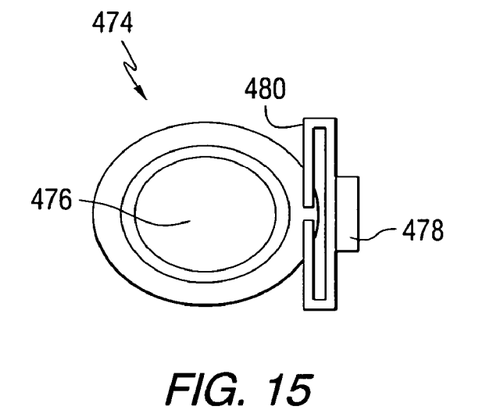
FIG. 15 is a plan view of a mirror assembly.

FIG. 15 is a plan view of a mirror assembly 474. A moveable mirror 476 is coupled to a fixed anchor 478 by a hinge 480. The hinged mirror may be actuated in many possible ways including electrostatically or magnetically. For example, in the case of magnetic actuation, a magnetic substance may be attached or deposited to the bottom of the mirror. Alternatively a small coil may be patterned on the back side of the mirror. The mirror may then be actuated by applying a local magnetic field (via other small coils) near the mirror to move the mirror about its hinge.

Figure 16:
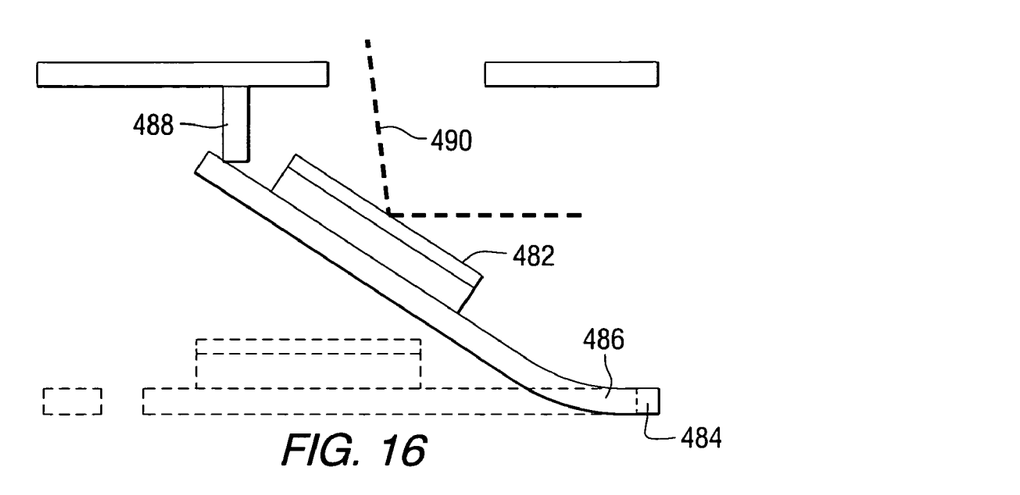
FIGS. 16 and 17 are side views of a mirror assembly.
Figure 17:
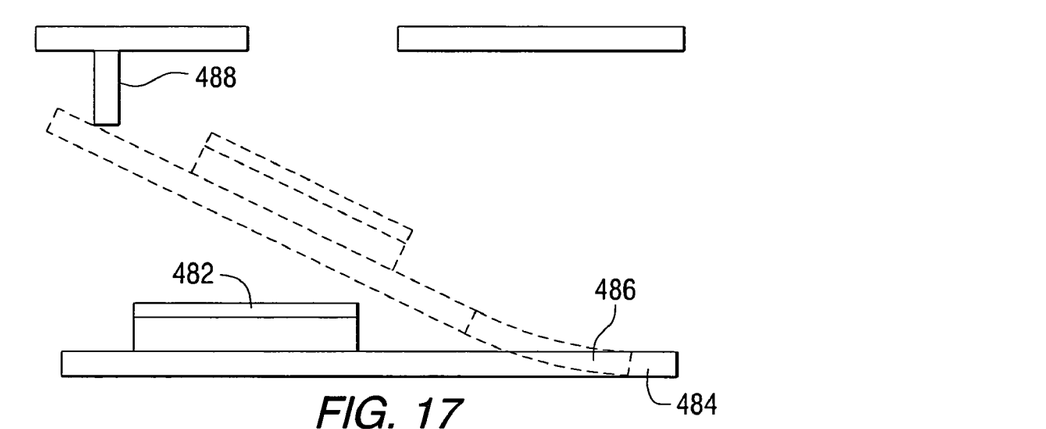

FIGS. 16 and 17 are side views of a mirror assembly including a mirror 482 coupled to a fixed anchor 484 by a hinge 486. An electromagnet 488 is used to move the mirror into a position that reflects light toward the slider. In FIG. 16 the mirror is in an "on" position that reflects light 490 toward a slider. In FIG. 17 the mirror is in an "off" position.

In an alternative embodiment, the actuated mirrors may be replaced by static beam splitters. For example, for the configuration in FIG. 12, the top three mirrors may be replaced by a 25/75 beam splitter, 33/67 beam splitter, and a 50/50 beam splitter respectively. The chain of beam splitters and the bottom mirror will then each direct 25% of the vertical incident beam to each slider. In this embodiment, no dynamic actuation will be required; however, a more powerful laser may be required.

Due to the optical properties of the rotating mirrors, polarization of the light coming from a stationary laser source may not remain constant at the slider gratings for different actuator arm angles, thus leading to a fluctuation of optical power coupled to the grating as a function of the actuator arm angle. This power fluctuation is predictable and may be easily characterized experimentally. To compensate for this power fluctuation, the output power of the laser source may be adjusted accordingly to achieve a constant value of power coupled to the grating as a function of actuator angle. To minimize the maximum output power requirement of the laser source, the polarization of the laser may be adjusted so that the maximum coupling efficiency would occur near the mid range of the actuator stroke.

Figure 18:
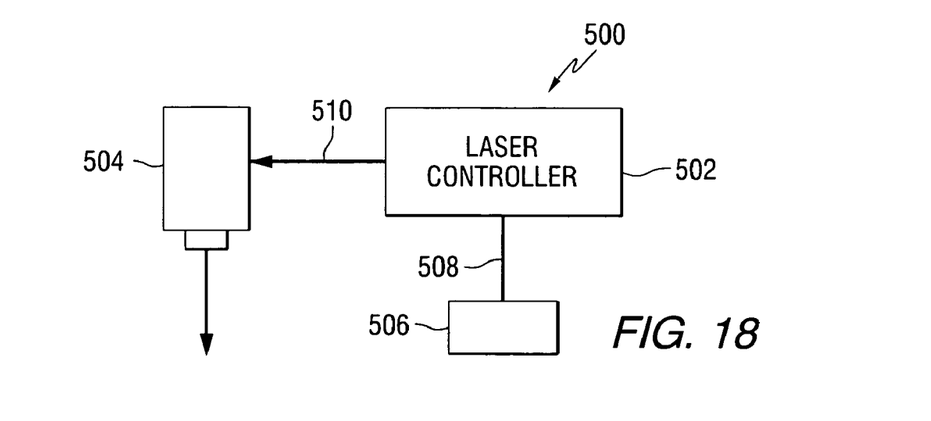
FIG. 18 is a schematic diagram of a laser control device.

FIG. 18 is a schematic diagram of a laser control system 500. The control system includes a laser controller 502 for controlling the position and/or intensity of a laser 504. A sensor 506 provides a signal on line 508 that is representative of a parameter that can be used to control the laser, for example, the position of the actuator arm or position of the laser on the optical transducer. The laser controller then produces a control signal on line 510 to control the position and/or intensity of the laser.

To adjust for misalignment due to manufacturing tolerances, it is conceivable to adjust the pointing angle of the incident laser beam for each individual head. In other words, the laser source or an appropriately optical component (such as a reflector) may be actuated to optimize the optical alignment with each individual recording head. An optical feedback signal may come from reflections from the grating or the media or special marks on the slider. Other light delivery schemes may also benefit from the proposed configuration for the laser source.

Cost, reliability, size, and thermal effects of the laser source are some concerns for drive systems with HAMR technology. The invention allows the use of a stationary laser source (i.e. not moving with the slider, suspension, or actuator). Therefore, the choices of laser diodes, packaging and heat sinking methods are not severely constrained as in the case of many other proposed light delivery methods. The invention also eliminates the need for expensive optical fiber. Due to the linear angular relationship between the actuator arm and the moving mirror, a passive mirror rotation system may be used to couple the motions of the two components, such that only a single actuator (the existing voice-coil actuator) may be used to rotate both components. As a result, no additional actuator, sensor, or feedback circuit is needed. Since the laser source is located away from the HGA and the actuator arm, the laser module can be easily accessible, thus simplifying the alignment process during drive-level assembly.

While the invention has been described in terms of several examples, it will be apparent to those skilled in the art that various changes can be made to the disclosed examples, without departing from the scope of the invention as set forth in the following claims.

What is claimed is:

1. An apparatus comprising:
   a moveable arm for positioning an optical transducer adjacent to a storage medium;
   a stationary light source;
   a moveable mirror mounted at a pivot axis of the arm for reflecting light from the light source to the optical transducer; and
   an actuator for rotating the moveable mirror through an angle of one half of an angle of rotation of the moveable arm, wherein the actuator comprises:
   a bearing having an inner race and an outer race;
   a first magnet coupled to the inner race:
   a second magnet coupled to the outer race;
   a third magnet coupled to a first end of the mirror and positioned between the first and second magnets, wherein poles of the third magnet are oriented opposite to poles of the first and second magnets;
   a fourth magnet coupled to the inner race;
   a fifth magnet coupled to the outer race; and
   a sixth magnet coupled to a second end of the mirror and positioned between the fourth and fifth magnets, wherein poles of the sixth magnet are oriented opposite to poles of the fourth and fifth magnets.

2. The apparatus of claim 1, further comprising:
   a fixed curved mirror positioned to receive light reflected from the moveable mirror and to reflect light to the optical transducer.

3. The apparatus of claim 1, wherein the optical transducer is mounted on a slider and the apparatus further comprises an optical bench positioned adjacent to the slider.

4. The apparatus of claim 1, wherein the moveable arm comprises an E-block and the apparatus further comprises:
   a second moveable arm for positioning a second optical transducer adjacent to the storage medium;
   a second stationary light source; and
   a second moveable mirror mounted at the pivot axis of the second moveable arm for reflecting light from the second light source to the second optical transducer.

5. The apparatus of claim 1, further comprising: a laser controller for controlling position and/or intensity of light from the light source.

6. An apparatus comprising:
   a moveable arm for positioning an optical transducer adjacent to a storage medium;
   a stationary light source;
   a moveable mirror mounted at a pivot axis of the arm for reflecting light from the light source to the optical transducer; and
   an actuator for rotating the moveable mirror through an angle of one half of an angle of rotation of the moveable arm, wherein the actuator comprises:
   a bearing having an inner race and an outer race;
   a first spring connected between the inner race and the outer race;
   a second spring connected between the inner race and the outer race; and
   said mirror coupled to an intermediate point on each of the first and second springs.

7. The apparatus of claim 6, wherein the first and second springs are rotational springs.

8. The apparatus of claim 6, wherein the first and second springs are linear springs.

9. The apparatus of claim 6, wherein each of the intermediate points is a midpoint.

10. The apparatus of claim 6, further comprising:
    a fixed curved mirror positioned to receive light reflected from the moveable mirror and to reflect light to the optical transducer.

11. The apparatus of claim 6, wherein the optical transducer is mounted on a slider and the apparatus further comprises an optical bench positioned adjacent to the slider.

12. The apparatus of claim 6, wherein the moveable arm comprises an E-block and the apparatus further comprises:
    a second moveable arm for positioning a second optical transducer adjacent to the storage medium;
    a second stationary light source; and
    a second moveable mirror mounted at the pivot axis of the second moveable arm for reflecting light from the second light source to the second optical transducer.

13. An apparatus comprising:
    a moveable arm for positioning an optical transducer adjacent to a storage medium;
    a stationary light source;
    a moveable mirror mounted at a pivot axis of the arm for reflecting light from the light source to the optical transducer; and
    an actuator for rotating the moveable mirror through an angle of one half of an angle of rotation of the moveable arm, wherein the actuator comprises:
    a bearing having an inner race and an outer race;
    a ring coupled to the mirror;
    a first plurality of springs connected between the ring and the inner race; and
    a second plurality of springs connected between the ring and the outer race.

14. The apparatus of claim 13, further comprising:
    a fixed curved mirror positioned to receive light reflected from the moveable mirror and to reflect light to the optical transducer.

15. The apparatus of claim 13, wherein the optical transducer is mounted on a slider and the apparatus further comprises an optical bench positioned adjacent to the slider.

16. The apparatus of claim 13, wherein the moveable arm comprises an E-block and the apparatus further comprises:
  a second moveable arm for positioning a second optical transducer adjacent to the storage medium;
  a second stationary light source; and
  a second moveable mirror mounted at the pivot axis of the second moveable arm for reflecting light from the second light source to the second optical transducer.

* * * * *

UNITED STATES PATENT AND TRADEMARK OFFICE
CERTIFICATE OF CORRECTION

PATENT NO. : 7,626,894 B2  Page 1 of 1
APPLICATION NO. : 11/105248
DATED : December 1, 2009
INVENTOR(S) : Bedillion et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1267 days.

Signed and Sealed this

Second Day of November, 2010

David J. Kappos
*Director of the United States Patent and Trademark Office*